(12) United States Patent
Ito

(10) Patent No.: US 8,379,998 B2
(45) Date of Patent: Feb. 19, 2013

(54) IMAGE PROCESSING APPARATUS AND METHOD

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1012 days.

(21) Appl. No.: 12/173,959

(22) Filed: Jul. 16, 2008

(65) Prior Publication Data
US 2009/0033766 A1 Feb. 5, 2009

(30) Foreign Application Priority Data

Jul. 31, 2007 (JP) ................................. 2007-199896

(51) Int. Cl.
*G06K 9/40* (2006.01)
*H04N 5/76* (2006.01)

(52) U.S. Cl. ................ 382/254; 348/E5.062; 348/231.2

(58) Field of Classification Search .................. 382/254; 348/E5.062, 231.2
See application file for complete search history.

(56) References Cited

U.S. PATENT DOCUMENTS

| | | | | | |
|---|---|---|---|---|---|
| 4,829,380 | A | * | 5/1989 | Iadipaolo | 348/678 |
| 4,860,118 | A | * | 8/1989 | Arimoto | 358/451 |
| 5,072,291 | A | * | 12/1991 | Sekizawa | 358/535 |
| 5,251,023 | A | * | 10/1993 | Arimoto et al. | 358/529 |
| 5,345,517 | A | * | 9/1994 | Katayama et al. | 382/299 |
| 5,459,589 | A | * | 10/1995 | Ohnishi et al. | 358/518 |
| 5,940,089 | A | * | 8/1999 | Dilliplane et al. | 345/553 |
| 5,945,972 | A | * | 8/1999 | Okumura et al. | 345/98 |
| 5,953,426 | A | * | 9/1999 | Windel et al. | 380/51 |
| 5,960,109 | A | * | 9/1999 | Shiau | 382/164 |
| 5,973,742 | A | * | 10/1999 | Gardyne et al. | 375/240.15 |
| 6,005,609 | A | * | 12/1999 | Cheong | 348/169 |
| 6,108,014 | A | * | 8/2000 | Dye | 345/544 |
| 6,181,438 | B1 | * | 1/2001 | Bracco et al. | 358/1.9 |
| 6,222,935 | B1 | * | 4/2001 | Okamoto | 382/149 |
| 6,282,325 | B1 | * | 8/2001 | Han | 382/270 |
| 6,332,045 | B1 | * | 12/2001 | Sawada et al. | 382/272 |
| 6,587,158 | B1 | | 7/2003 | Adams et al. | 348/716 |
| 6,597,362 | B1 | * | 7/2003 | Norman | 345/505 |
| 6,950,559 | B2 | | 9/2005 | Kobayashi | 382/260 |
| 2005/0168770 | A1 | * | 8/2005 | Kurose et al. | 358/1.15 |
| 2006/0056738 | A1 | * | 3/2006 | Keithley et al. | 382/307 |
| 2006/0119895 | A1 | * | 6/2006 | Takata et al. | 358/3.26 |
| 2006/0222269 | A1 | * | 10/2006 | Ohno | 382/300 |
| 2006/0232620 | A1 | * | 10/2006 | Kitamura et al. | 347/15 |
| 2007/0229907 | A1 | * | 10/2007 | Suzuki | 358/3.04 |

FOREIGN PATENT DOCUMENTS

| | | |
|---|---|---|
| JP | 04-034865 B | 6/1992 |
| JP | 63-263577 A | 10/1998 |
| JP | 2000-312327 | 11/2000 |
| JP | 2004-147165 A | 5/2004 |
| JP | 2006-139606 | 6/2006 |

OTHER PUBLICATIONS

Translation of JP 2006139606 provided by AIPN machine translation.*
Office Action which issued on Feb. 14, 2012, in counterpart Japanese application No. 2007-199896.
Japanese Office Action issued Jun. 25, 2012, in counterpart Japanese application No. 2007-199896.

* cited by examiner

*Primary Examiner* — Michelle Entezari
(74) *Attorney, Agent, or Firm* — Fitzpatrick, Cella, Harper & Scinto

(57) ABSTRACT

An image processing apparatus reads a unit of first image data corresponding to a first region, a unit of pixels at a time, from a first memory storing image data in a band area and reads second image data to be used in processing of multiple processing object pixels corresponding to the first region from a second memory. The image processing apparatus processes each of the multiple processing object pixels by using pixels in a second region containing each of the multiple processing object pixels and stores data of pixels contained in the first image data to be used in processing of other multiple pixels in the second memory.

17 Claims, 10 Drawing Sheets

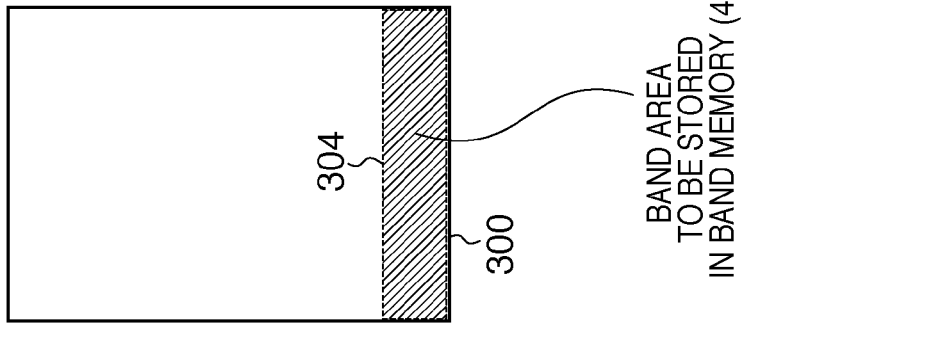
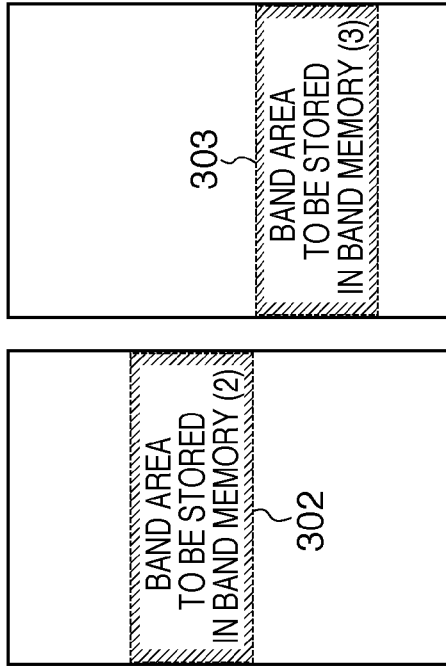
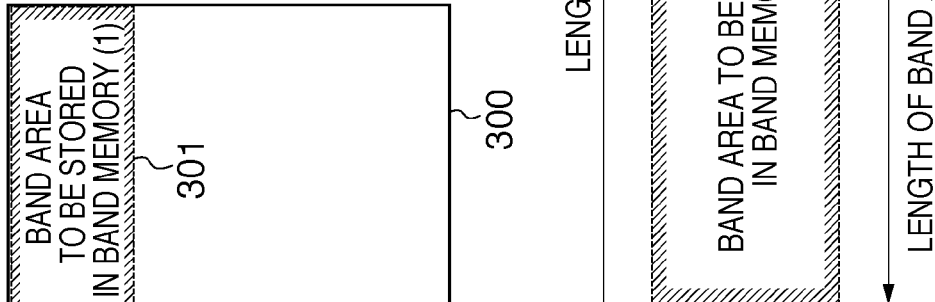
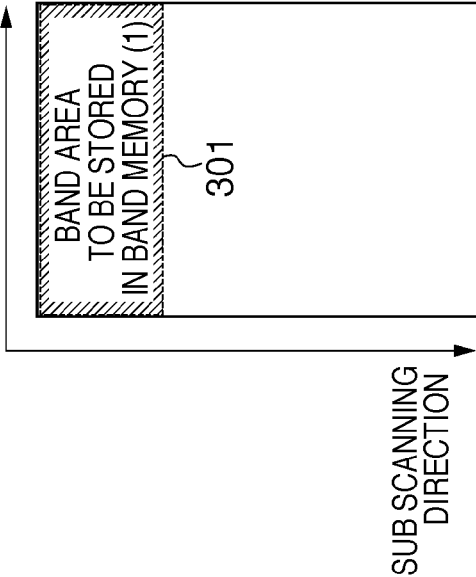
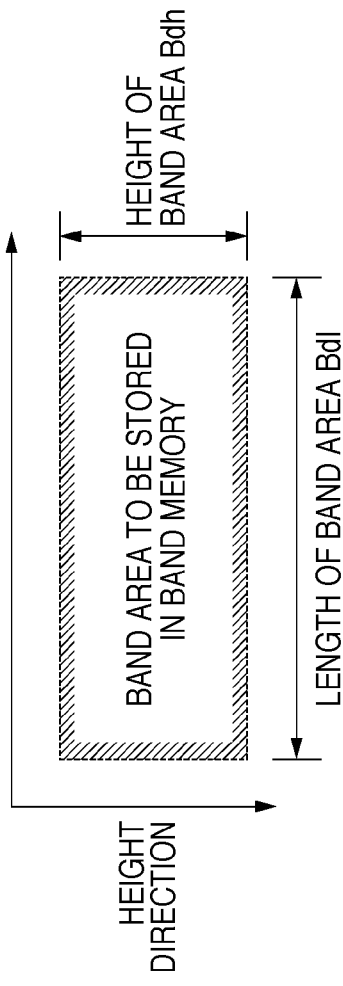

FIG. 6A

PIXEL VALUE
[SYMBOLS IN PARENTHESES REPRESENT COORDINATES]

| p(i-1, j-1) | p(i, j-1) | p(i+1, j-1) |
|---|---|---|
| p(i-1, j) | p(i, j) | p(i+1, j) |
| p(i-1, j+1) | p(i, j+1) | p(i+1, j+1) |

FIG. 6B

WEIGHT MATRIX

| 0.0 | 1.0 | 0.0 |
|---|---|---|
| 1.0 | -4.0 | 1.0 |
| 0.0 | 1.0 | 0.0 |

IMAGE PROCESSING APPARATUS AND METHOD

BACKGROUND OF THE INVENTION

1. Field of the Invention

The present invention relates to an image processing apparatus and method.

2. Description of the Related Art

Local (neighborhood) image processing such as spatial filtering has been performed when an image is generated and output. Local image processing is image processing in which some computation is performed using all pixels in a spatial filter area containing the pixels to be processed (hereinafter simply referred to as processing object pixels).

For example, spatial filtering such as edge enhancement or blurring is applied to digital image data 300 shown in FIG. 3A. There are local image processing techniques in which digital image data is divided into areas and local image processing is performed in each of the areas (see U.S. Pat. No. 6,587,158, Japanese Patent Application Laid-Open No. 2000-312327, U.S. Pat. No. 6,950,559, and Japanese Patent Application Laid-Open No. 2006-139606). These techniques, in general, divide one picture of digital image data into strip-like areas and apply various types of image processing to the areas one after another, as shown in FIGS. 3A to 3D.

The strip-like areas are called band areas, a memory area in which the band areas are loaded is called band memory, and the act of dividing a picture is called band division. A band memory may be provided in any memory area on a system. For simplicity of explanation, an example will be described herein in which the band memory is provided in a main memory.

As a coordinate system (main scanning direction, sub scanning direction) for digital image data, a new coordinate system (band area coordinate system) having the length and height directions is defined, and a band area is represented by length times height, as shown in FIG. 3E. The length of a band area is always equal to the value of the width of digital image data in the main scanning direction or the height in the sub scanning direction; the height of the band area can be any value.

The band processing will be described in further detail. A first band area 301 shown in FIG. 3A is first loaded (rendered) into a band memory on a main memory and image processing is applied to the first band area 301. Then, a second band area 302 shown in FIG. 3B is loaded on the band memory where the first band area 301 has been loaded to overwrite the first band area 301 and image processing is applied to the second band area 302. A third band area 303 shown in FIG. 3C is loaded on the band memory where the second band area 302 has been loaded to overwrite the second band area 302 and image processing is applied to the third band area 303. Finally, a fourth band area 304 shown in FIG. 3D is loaded on the band memory where the third band area 303 has been loaded to overwrite the third band area 303 and image processing is applied to the fourth band area 304.

As is apparent from FIGS. 3A to 3D, the band areas 301 to 304 have the same length but do not need to have the same height. The height of the band memory, which is a memory area reserved on the main memory, is determined by the height of the highest band areas (the first to third band areas 301 to 303 in FIGS. 3A to 3D).

In these techniques, a scheme is used for overlapping adjacent band areas at the boundaries between them so that local image processing can be performed with no space between the adjacent band areas. In Japanese Patent Application No. 2006-139606, pixels are scanned one by one in the direction of height of each band area so that the size of a delay memory holding processing object pixels required for local image processing is defined by the height of the band area, thereby reducing the size of the delay memory.

With the aim of differentiating devices, the resolutions of digital image data are being increased to improve image quality. As the resolutions increase, the amount of data to be processed in image processing is also increasing. It is desirable to avoid increasing the size of circuitry with increasing amount of data to be processed in image processing. To keep the feeling users experience optimal while using devices, image processing time cannot be increased. Therefore there is also a demand for a method for increasing the speed of image processing with increasing resolution of digital image data.

While the related art techniques specify that pixels are scanned one by one in the direction of height of band areas in local image processing and make mention of reducing the size of delay memories, the related art techniques did not sufficiently increase the speed of image processing.

SUMMARY OF THE INVENTION

Objects of the present invention are to reduce the size of circuitry for image processing and to increase the speed of the image processing.

Another object of the present invention is to provide an image processing method including: a first readout step of reading first image data of a plurality of pixels as a unit from a first memory storing image data in a band area, the first image data corresponding to a first region; a second readout step of reading second image data to be used for processing a plurality of processing object pixels corresponding to the first region from a second memory; a processing step of processing each of the plurality of processing object pixels by using a pixel in a second region containing each of the plurality of processing object pixels extracted from the first and second image data; and a memory step of storing pixel data contained in the first image data to be used for processing a plurality of other pixels in the second memory.

Yet another object of the present invention is to provide an image processing apparatus including: a first readout unit configured to read first image data of a plurality of pixels as a unit from a first memory storing image data in a band area, the first image data corresponding to a first region; a second readout unit configured to read second image data to be used for processing a plurality of processing object pixels corresponding to the first region from a second memory; a processing unit configured to process each of the plurality of processing object pixels by using a pixel in a second region containing each of the plurality of processing object pixels extracted from the first and second image data; and a memory unit configured to store pixel data contained in the first image data to be used for processing a plurality of other pixels in the second memory.

Further features of the present invention will become apparent from the following description of exemplary embodiments with reference to the attached drawings.

BRIEF DESCRIPTION OF THE DRAWINGS

FIGS. 3A to 3E are diagrams showing the first embodiment of the present invention and illustrating an exemplary operation of band processing;

FIGS. 6A and 6B are diagrams showing the first embodiment of the present invention and depicting an exemplary spatial filtering area;

DESCRIPTION OF THE EMBODIMENTS

First Embodiment

Figure 1:
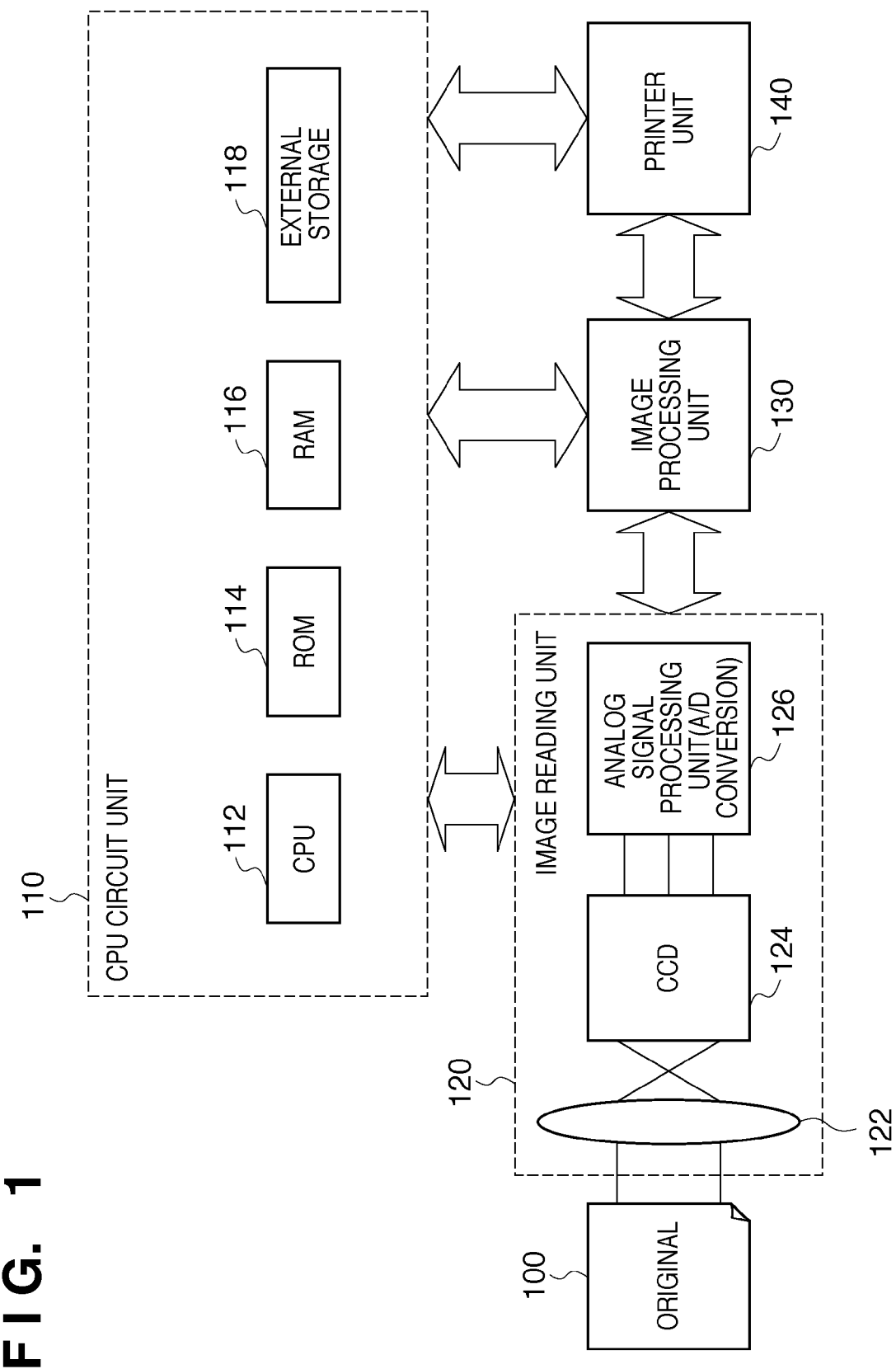
FIG. 1 is a block diagram showing a first embodiment of the present invention and depicting an exemplary general configuration of an image processing apparatus.

FIG. 1 is a block diagram showing an exemplary general configuration of an image processing apparatus according to a first embodiment. An image reading unit 120 in FIG. 1 includes a lens 122, a CCD sensor 124, and an analog signal processing unit 126. In the image reading unit 120, image information on an original 100 that is formed on the CCD sensor 124 through the lens 122 is converted by the CCD sensor 124 to analog electrical signals of R (Red), G (Green), and B (Blue).

The analog electrical signals converted from the image information are input into the analog signal processing unit 126, where processing such as correction is applied to the R, G, and B signals separately, and then the resulting signals are converted to digital signals (A/D conversion). Thus, a digital full-color signals (hereinafter referred to as the digital image signals) is generated. The generated digital image signals are input into an image processing unit 130. The image processing unit 130 applies input correction processing, spatial filtering, color space conversion, density correction, and halftone processing, which will be described later, to the digital image signals and outputs the resulting digital image signals to a printer unit 140. The printer unit 140 includes a printout unit (not shown) such as a raster plotter that uses inkjet heads or thermal heads, for example, and records an image based on input digital image signals on paper.

A CPU circuit unit 110 includes a CPU 112 for processing and controlling, a ROM 114 for storing fixed data and programs, a RAM 116 used for temporarily storing data and loading a program, and an external storage 118. The CPU circuit unit 110 controls components such as the image reading unit 120, the image processing unit 130, and the printer unit 140 and centrally controls a process sequence of the image processing apparatus of the present embodiment.

The external storage 118 is a storage medium such as a disk storing parameters and programs used by the image processing apparatus of the present embodiment. Data and programs may be loaded from the external storage 118 into the RAM 116.

Figure 2:
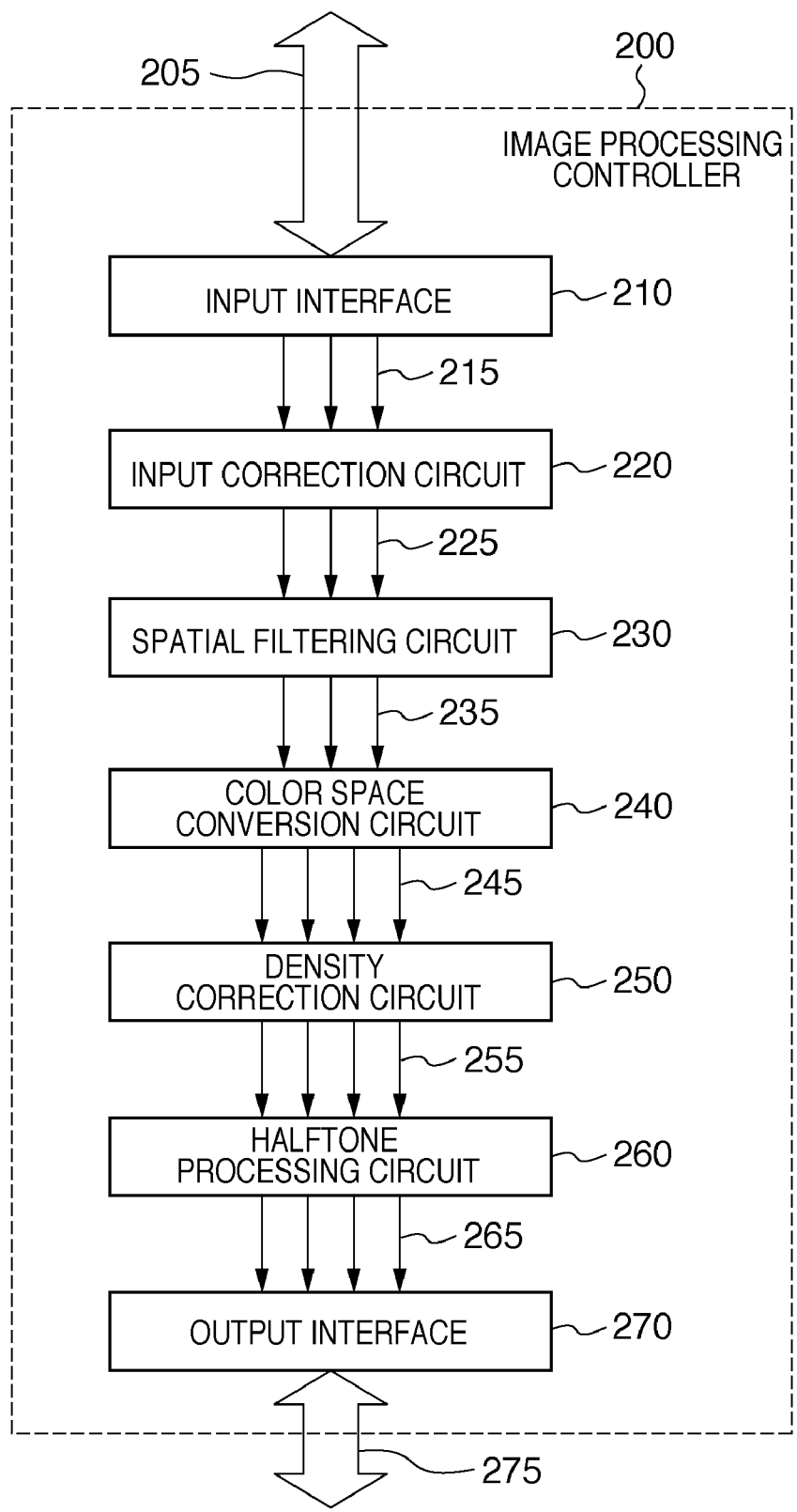
FIG. 2 is a block diagram showing the first embodiment of the present invention and depicting an exemplary circuit configuration of an image processing unit.

The image processing unit 130 in FIG. 1 will be describe in detail. FIG. 2 is a block diagram showing an exemplary configuration of an image processing controller 200, which is a main circuit component of the image processing unit 130 of the present embodiment. When digital image signals are input from the analog signal processing unit 126 into the image processing controller 200 through a bus 205, image processing described below is performed.

The image processing controller 200 includes an input interface 210, an input correction circuit 220, a spatial filtering circuit 230, a color space conversion circuit 240, a density correction circuit 250, a halftone processing circuit 260, and an output interface 270. The input correction circuit 220, the spatial filtering circuit 230, the color space conversion circuit 240, the density correction circuit 250, and the halftone processing circuit 260 will be described in detail below.

[Input Correction Circuit 220]

Digital image signals 215 from the image reading unit 120 are input into the input correction circuit 220 through the input interface 210. The digital image signal 215 includes luminance signals R, G, and B. The input correction circuit 220 applies processing to the input digital image signals for correcting variations in characteristics of a sensor that reads an original 100 and light distribution characteristics of lamps for illuminating the original.

[Spatial Filtering Circuit 230]

Digital image signals (luminance signals R, G, and B) 225 output from the input correction circuit 220 are input into the spatial filtering circuit 230. The spatial filtering circuit 230 applies local image processing such as smoothing and edge enhancement to the digital image signals (luminance signals R, G, and B) 225.

[Color Space Conversion Circuit 240]

Digital image signals (luminance signals R, G, and B) 235 output from the spatial filtering circuit 230 are input into the color space conversion circuit 240. The color space conversion circuit 240 converts the luminance signals R, G, and B of the digital image signals 235 to density signals C (Cyan), M (Magenta), Y (Yellow), and K (Black).

[Density Correction Circuit 250]

Digital image signals (density signals C, M, Y, and K) 245 output from the color space conversion circuit 240 are input into the density correction circuit 250. The density correction circuit 250 applies density correction to the digital image signals (density signals C, M, Y, and K) 245. The density correction circuit 250 preliminarily performs the density correction by taking into consideration the characteristics of halftone processing in order to prevent a change in density when the signal are binarized in the halftone processing circuit 260 in the subsequent stage.

[Halftone Processing Circuit 260]

Digital image signals (density signals C, M, Y, and K) 255 output from the density correction circuit 250 are input into the halftone processing circuit 260. The halftone processing circuit 260 applies screening processing to the digital image signals (density signals C, M, Y, and K) 255 to convert them to binary halftone representation.

In this way, the binary digital image signals (printing signal C, M, Y, and K) 265 are output to the printer unit 140 through the output interface 270 and a bus 275.

In the present embodiment, image processing specialized to band processing is performed to reduce the size of a delay memory. Furthermore, multiple pixels are treated as a processing unit to reduce the circuitry size and increase the processing speed of the image processing apparatus. In the present embodiment, in order to achieve these objects, image processing is performed in a band area coordinate system different from the coordinate system (main scanning direction, sub scanning direction) for digital image data).

Figure 4A:
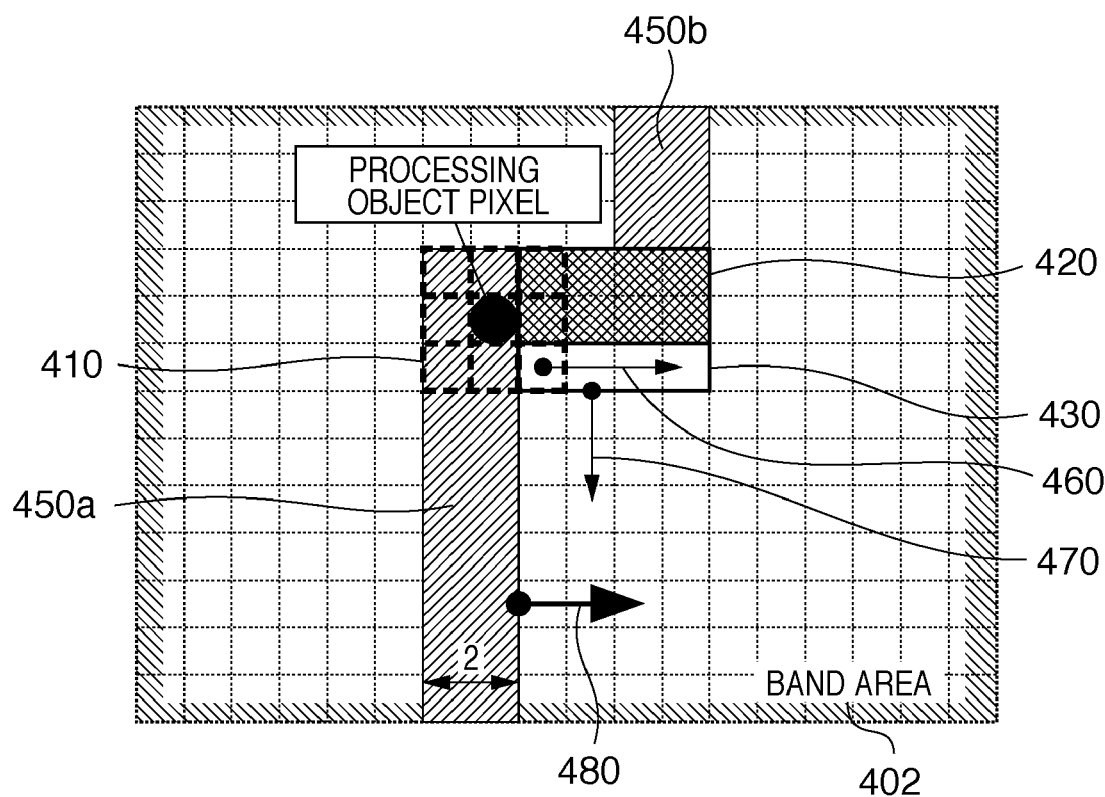
FIGS. 4A to 4E are diagrams showing the first embodiment of the present invention and illustrating an exemplary image processing method.
Figure 4B:
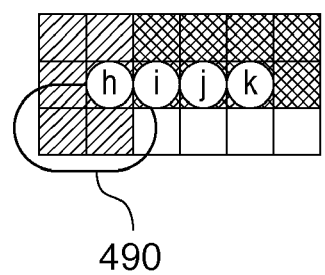
Figure 4C:
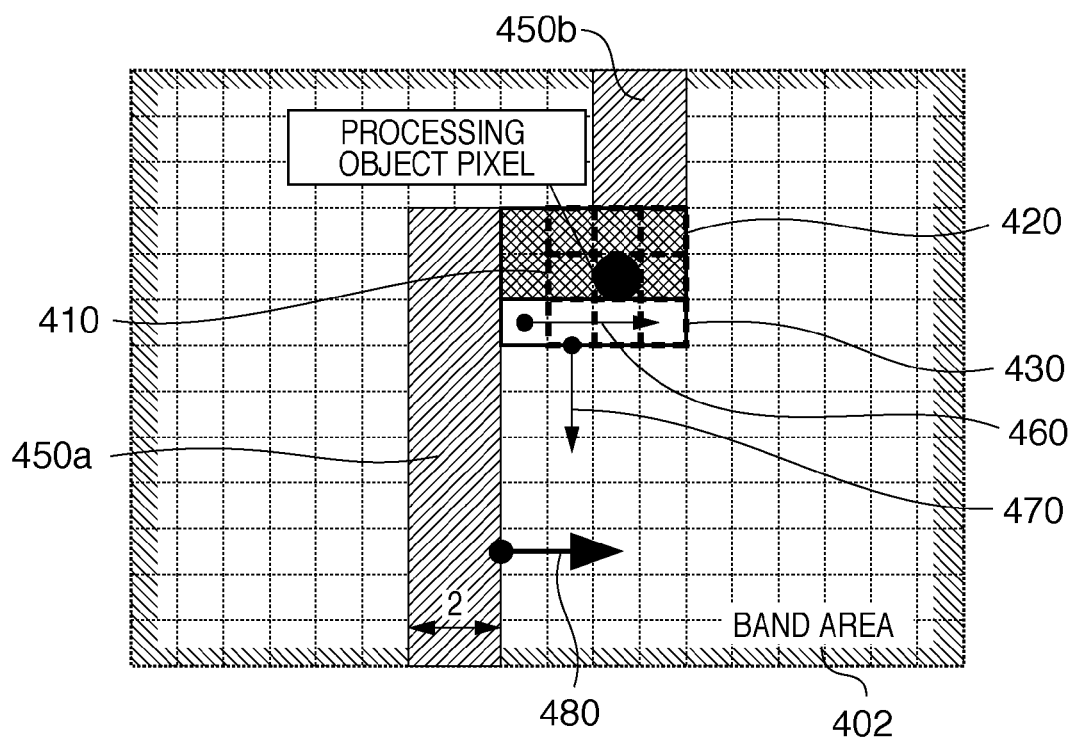
Figure 4D:
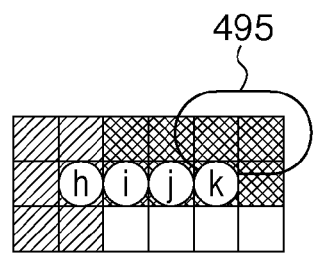
Figure 4E:
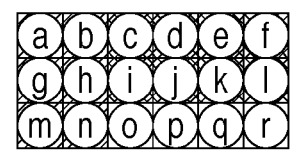

FIGS. 4A to 4E are diagrams illustrating an exemplary operation for reading (scanning) pixel data from a band area (band memory) by an image processing method of the present embodiment. An area 402 indicated by hatched lines in FIGS. 4A and 4E is a band area (corresponding to a band area 301, for example) extracted from digital image data 300 shown in FIGS. 3A to 3D.

First, the number of pixels N in a set of pixels 430 treated at a time along the length of the band area starting from the upper left corner of the band area 402 is set. Here, N is an integer greater than or equal to 2. In the example in FIGS. 4A to 4E, N=4 pixels. The pixel set 430 consists of four pixels arranged in the length direction in a row with a height of one pixel. The subsequent image processing is applied to each set of four pixels 430 as a unit. The image processing is applied to the four pixels along the length of the band area and then the scanning is performed one pixel downward in the direction of height of the band area. When the scanning reaches the four pixels along the bottom edge of the band area 402, the scanning is repeated from the four pixels along the top edge of the band area.

That is, reading of N (four) contiguous pixels along a first direction, that is, the direction of length of the band area 402, as a unit is repeated in a second direction, that is, the direction of the height of the band area 402, one pixel down each time, until the bottom edge of the band area 402 is reached. Such reading of a set of N pixels is sequentially performed to scan the band area 402. The first and second directions are orthogonal to each other and the size (four pixels) in the first direction (length direction) is set to be greater than the size (one pixel) in the second direction (height direction).

The sequence of scanning and image processing is continued until the lower right pixel of the band area is reached and then band processing of one band area ends. In this way, according to the present embodiment, sets of N pixels are processed one after another in the direction of length of a band area while shifting in the direction of height of the band area by one pixel.

The nine pixels in a spatial filter area 410 of 3 times 3 pixels shown in FIG. 4A are a set of pixels to be processed and correspond to the nine pixels shown in FIG. 6A. FIG. 4A shows a state in which one pixel in the set of pixels 430 that corresponds to pixel p (i+1, j+1) in FIG. 6A has been input into the spatial filtering circuit 230 shown in FIG. 5A and all of the nine pixels in the spatial filter area 410 have been made available in the spatial filtering circuit 230.

It is assumed in the present embodiment that the area of processing object pixels in the spatial filtering circuit 230 is of a size fw [pixels] in the direction of length of a band area and fh [pixels] in the direction of height of the band area. That is, the area of a set of processing object pixels can be expressed by fw times fh pixels. In the example, the area is a 3 times 3 pixel region. If the number of pixels in a set that is a unit of processing in the direction of length of the band area is set to N [pixels], {(fw−1)+N}*fh [pixels] are held in the spatial filtering circuit 230. In the example shown in FIGS. 4A to 4D, {(3−1)+4}*3=18 [pixels] are held in the spatial filtering circuit 230 so that the pixels are available for filtering (in a sum of products operation circuit 565). In the following description, the 18 pixels held and made available in the spatial filtering circuit 230 are denoted by symbols a to r as shown in FIG. 4E, for convenience of explanation.

Figure 5A:
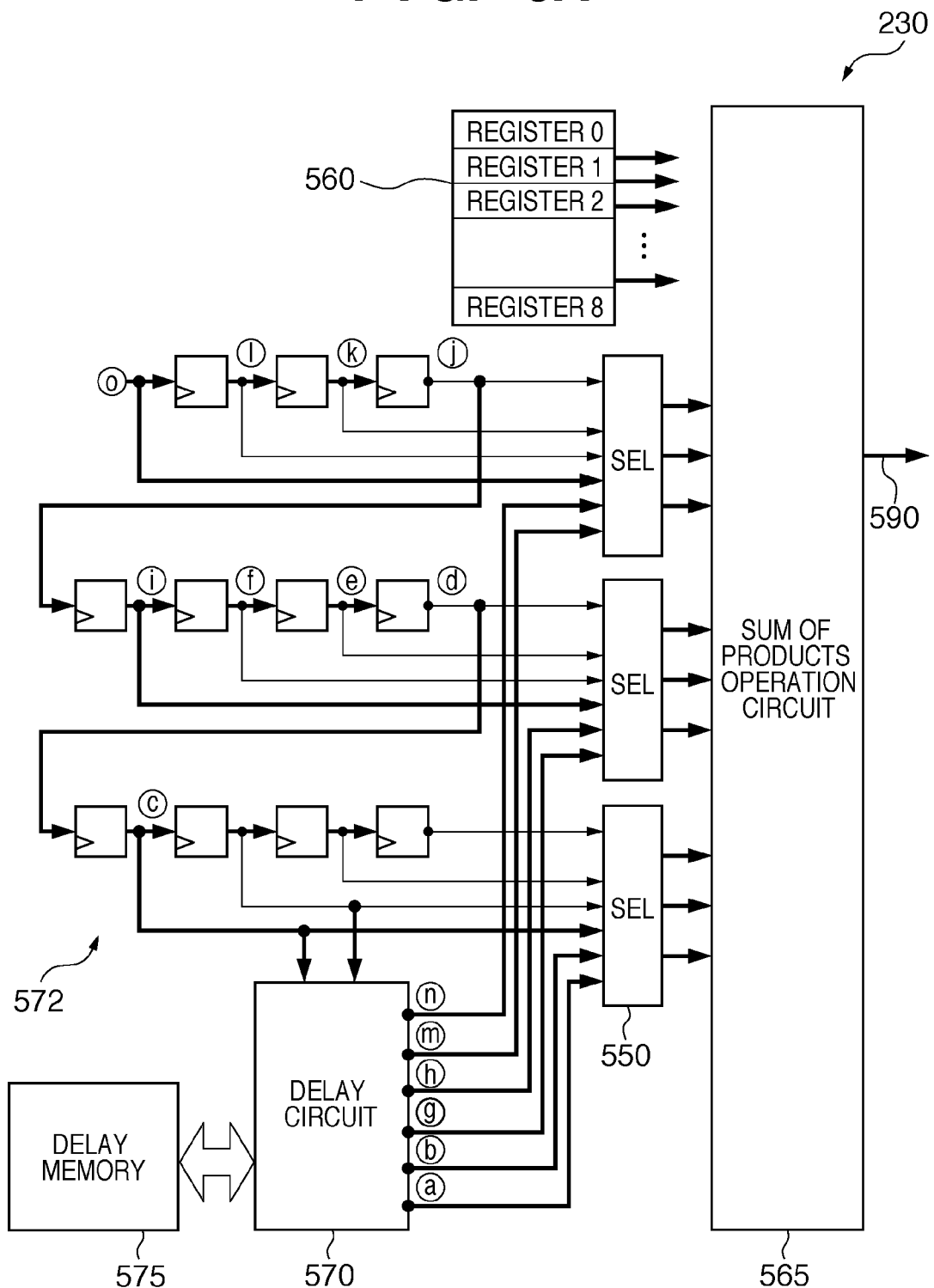
FIG. 5A is a diagram showing the first embodiment of the present invention and illustrating an exemplary configuration of the image processing apparatus (spatial filtering circuit)

In particular, the 18 pixels are:
processing object pixels o, p, q, and r in a pixel set 430 input from the band memory by a reading operation,
processing object pixels c, d, e, f, i, j, k, and l in an area 420 in FIG. 4A held in a delay register 572, which functions as a shift register, and
processing object pixels a, b, g, h, m, and n read from a delay memory 575 shown in FIG. 5A.

Here, pixels o, p, q, and r correspond to pixel p (i+1, j+1) in FIG. 6A.

Pixels i, j, k, and l are pixels input from the band memory immediately before pixels o, p, q, and r.

Pixels c, d, e, and f are pixels input from the band memory immediately before pixels i, j, k, and l.

Pixels m and n are read from the delay memory 575 by a delay circuit 570 in response to the input of pixels o, p, q, and r from the band memory. Pixels g and h are read from the delay memory 575 in response to the input of pixels i, j, k, and l from the band memory. Pixels a and b are read from the delay memory 575 in response to the input of pixels c, d, e, and f from the band memory.

In this way, pixel data in an area to be processed having a predetermined size (6 times 3 pixels a to r in FIGS. 4A to 4E) including a newly read set of pixels (o, p, q, r) are made available for image processing through the delay register 572 and the delay memory 575 at each read operation. In this example, N times fh pixel data consisting of fh sets of N contiguous pixels obtained by a reading operation are held in the delay register 572, where fh is the number of pixels in the height direction.

An operation of the spatial filtering circuit 230 will be described with reference to the block diagram of the spatial filtering circuit 230 shown in FIG. 5A.

First, a processing object pixel o in a pixel set 430 is input from an external source. The spatial filtering circuit 230 accesses the delay memory 575 through the delay circuit 570 to read processing object pixels m and n that are on the same line as processing object pixel o that reside in location 490 in FIG. 4B. A selector 550 selects the processing object pixels m and n, processing object pixels a, b, g, and h that have been read from the delay memory 575 before the processing object pixel o is processed, and processing object pixels c and i already held in the delay register 572. The pixel values of the nine processing object pixels (a, b, c, g, h, i, m, n, and o) thus extracted by the selector 550 are placed in the sum of products operation circuit 565. Thick lines in FIG. 5A represent how these pixels are selected.

Nine weight values are placed in the sum of products operation circuit 565 from a weight matrix register 560 shown in FIG. 5A used for storing a weight matrix shown in FIG. 6B. The sum of products operation circuit 565 uses the nine weight values from the weight matrix register 560 and the pixel values of the selected nine pixels to perform a predetermined operation and outputs the result 590 of the filter operation on the processing object pixels. The output value is the result of image processing on processing object pixel h shown in FIG. 4A.

Figure 5B:
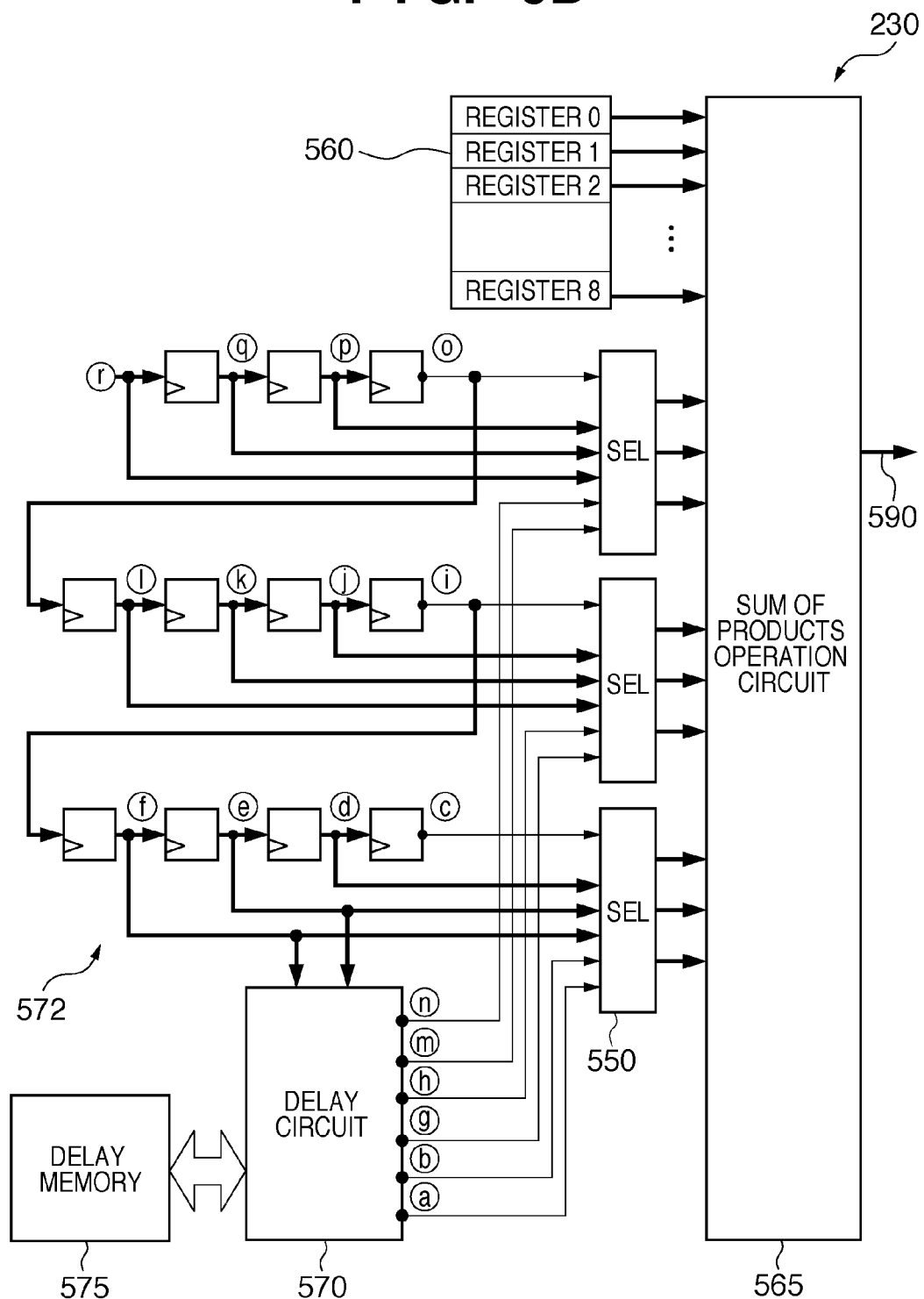
FIG. 5B is a diagram showing the first embodiment of the present invention and depicting an exemplary configuration of the image processing apparatus (spatial filtering circuit)

Processing object pixels o, p, q, and r in the pixels set 430 are sequentially input and image processing is performed on processing object pixels, h, i, j, and k, in this order. FIGS. 4C and 5B show image processing (spatial filtering) being performed on processing object pixel k. The pixel values of nine processing object pixels d, e, f, j, k, l, p, q, and r selected by the selector 550 are placed in the sum of products operation circuit 565 in FIG. 5B, where thick lines indicate how these pixels are selected.

Finally, the image processing apparatus (spatial filtering circuit 230) shown in FIG. 5B accesses the delay memory 575 through the delay circuit 570 and overwrites the regions where processing object pixels a and b reside on the delay memory 575 with processing object pixels e and f positioned in location 495 in FIG. 4D. Thus, the pixel values of pixels a and b are deleted and the pixel values of pixels e and f are stored in place.

As a result of the ringwise FIFO (First-In First-Out) operation by the delay circuit 570, pixel regions 450a and 450b stored in the delay memory 575 shown in FIG. 4A occupy always two lines (the number of the lines is smaller than the width fh of the spatial filter area 410 by 1).

As the processing of sets of pixels progresses, the set of pixels 430 input moves in the direction 460 (the direction of length of the band area) perpendicular to the scanning direction 470 (the direction of height of the band area). Similarly, the pixel regions 450a and 450b to be stored in the delay memory 575 moves in the direction perpendicular to the scanning direction 470. In FIG. 4A, the direction in which the pixel regions 450a and 450b to be stored in the delay memory 575 moves is depicted as the scanning direction 480 of the delay memory. That is, pixel regions 450a to be stored in the delay memory 575 moves to 450b in FIGS. 4A and 4B. In this way, a pixel region to be held in the delay memory 575 moves in the scanning direction 480 of the delay memory by the number N (=4) of pixels in a pixel set described above.

Here, only two data accesses to the delay memory 575 are required for processing the set of N pixels, one read access and one write access. That is, in this example of the present embodiment, only two accesses to the delay memory 575 are required for processing one set of four pixels (N=4): access for reading pixels m and n and access for writing pixels e and f. Accordingly, the delay memory 575 can be implemented by one single-port (1-port) memory. It is assumed in the present embodiment that the bit length of one word read or written by one access to the delay memory 575 is equivalent to two pixels.

In a typical spatial filtering circuit, processing of one pixel always involves two accesses to a delay memory. Accordingly, in order to implement a fast spatial filtering circuit that processes one pixel per clock cycle, two data accesses per pixel need to be made in one clock cycle. Therefore, interleaved access needs to be performed by using one dual-port (2-port) memory or two single-port (1-port) memories.

In the present embodiment, image processing is performed using a set of two or more pixels as a unit and data access is made to the set of pixels in the delay memory, therefore data access does not concentrate in one clock cycle. The pixel scanning method according to the present embodiment is designed for achieving such data access.

While the sequence of image processing shown in FIG. 2 (input correction processing, color space conversion, density correction, and halftone processing), excluding the spatial filtering, is not local image processing, the use of the method for scanning processing object pixels according to the present embodiment does not cause any problem.

If a set of pixels 430 which is a unit of image processing is set in the direction of height of a band area in contrast to the example of the embodiment described above, the pixel region 490 required to be read from the delay memory 575 at a time in order to process the set of pixels 430 would contain more pixels than the pixel region 490 shown in FIG. 4B.

In the method according to the present embodiment in which band division is used to sequentially perform image processing, the height of a band area needs to be changed in accordance with the size of the image as shown in FIGS. 3A to 3D. That is, the height of a band area is not fixed but can vary, like the band area 304. If a set of pixels is set in the direction of height of a band area, the possibility arises that the set of pixels cannot fit to the height of a band area. On the other hand, in the embodiment shown in FIGS. 4A to 4E, scanning is performed by only pixel by pixel in the direction of height of a band area and therefore the embodiment is suitable for flexible setting of band height, which is an advantage of sequential image processing using band division.

In summary, according to the first embodiment, one picture of digital image data 300 is divided into band areas 301 to 304 and the band areas 301 to 304 are sequentially assigned to a band memory, a set of N contiguous pixels 430 in the direction of length of a band area is set as a basic unit for image processing, pixel set 430 reading is shifted pixel by pixel in the direction (height direction) perpendicular to the direction of length of the band area, pixel data of a predetermined number of sets of contiguous pixels along the height direction is held in a delay register 572 as they are read, after each read operation, pixel data in the delay memory 575 that is no longer needed is replaced with pixel data to be subsequently used among pixel data deleted from the delay registers 572, thereby updating the delay memory 575 ringwise, and after each read operation, the pixel data in an area of predetermined size ({fw−1}+N)*fh) to be processed that includes a newly read set of pixels is provided for image processing through use of the delay register 572 and the delay memory 575, thereby performing image processing.

In particular, image processing is performed while holding some pixels of a scanned set of pixels in the delay memory 575 that is updated ringwise and has a size equivalent to a predetermined number of pixels that depends on the product of the height of a band area and (the width fw of a spatial filter area 401 minus 1). A delay memory in a conventional image processing circuit has a size equal to the line length multiplied by the height fh of a spatial filter area, or the line length multiplied by (the height fh of a spatial filter area minus 1). In the present embodiment, on the other hand, the size of the delay memory 575 is equal to the height of a band area multiplied by "the width fw of a spatial filter area 401 minus 1". Because the height of a band area in general is smaller than the line length of the band area, the size of the delay memory 575 is small and therefore the size of circuitry is small.

According to the inventive method for scanning pixels described above, data in the delay memory 575 shifts in the scanning direction 480 of the delay memory 575 by a set of N pixels as a unit as described above. Consequently, the number of data accesses to the delay memory 575 is two for N pixels (one set of pixels 430) in the present embodiment. Thus, the frequency of data accesses to the delay memory per pixel is reduced. Therefore, the delay memory 575 can be shared among pixels constituting a pixel set and the circuitry size can be reduced even if the speed of spatial filtering circuit 230 is increased.

While the embodiment has been described with respect to an example in which image data obtained by dividing one picture into band areas is processed, the embodiment is also applicable to processing of image data obtained from one picture.

Second Embodiment

A second embodiment of the present invention will be described. In the second embodiment, N pixels in a pixel set are processed in a parallel distributed manner and therefore image processing faster than that in the first embodiment can be performed. By a method for increasing the speed of the processing described below, the speed of image processing can be increased in keeping with increase of the resolution of digital image data. In the description of the second embodiment, the same elements as those in the first embodiment described above are labeled with the same reference numerals or symbols as those in FIGS. 1 to 6A and 6B and further description thereof will be omitted.

Figure 7:
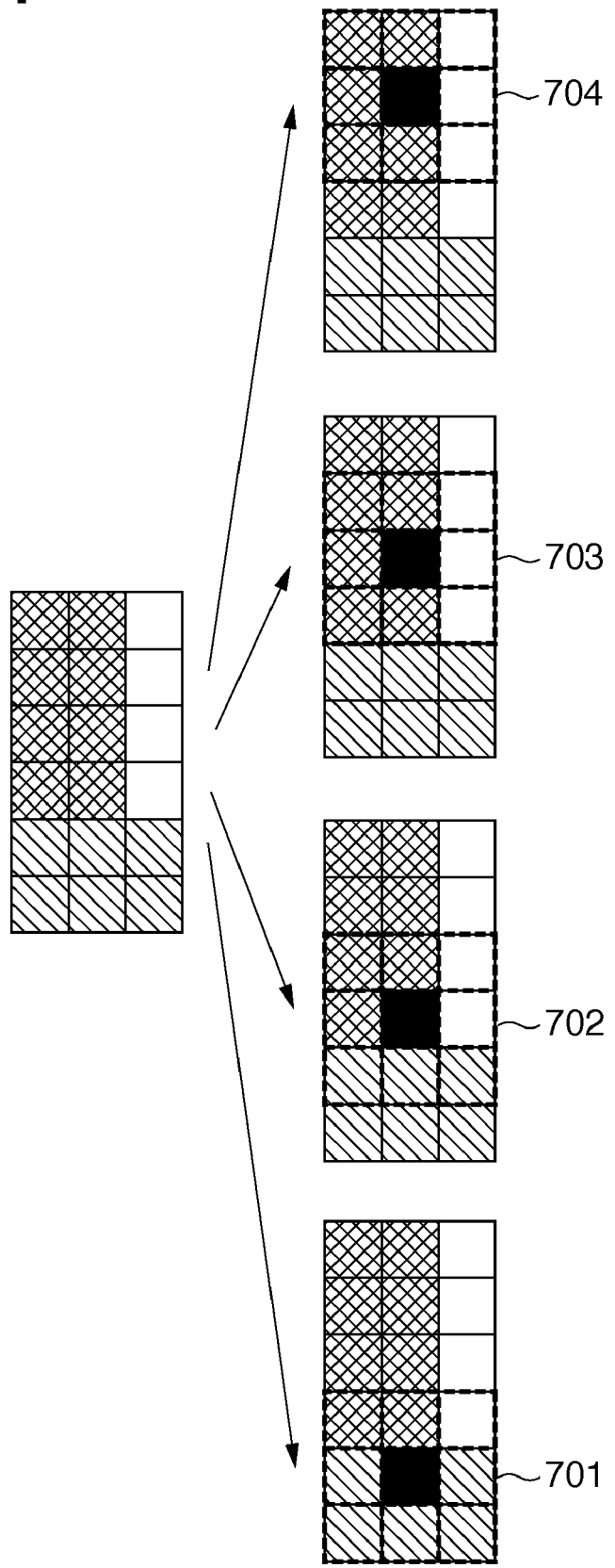
FIG. 7 is a diagram showing a second embodiment of the present invention and illustrating an exemplary image processing method.
Figure 8:
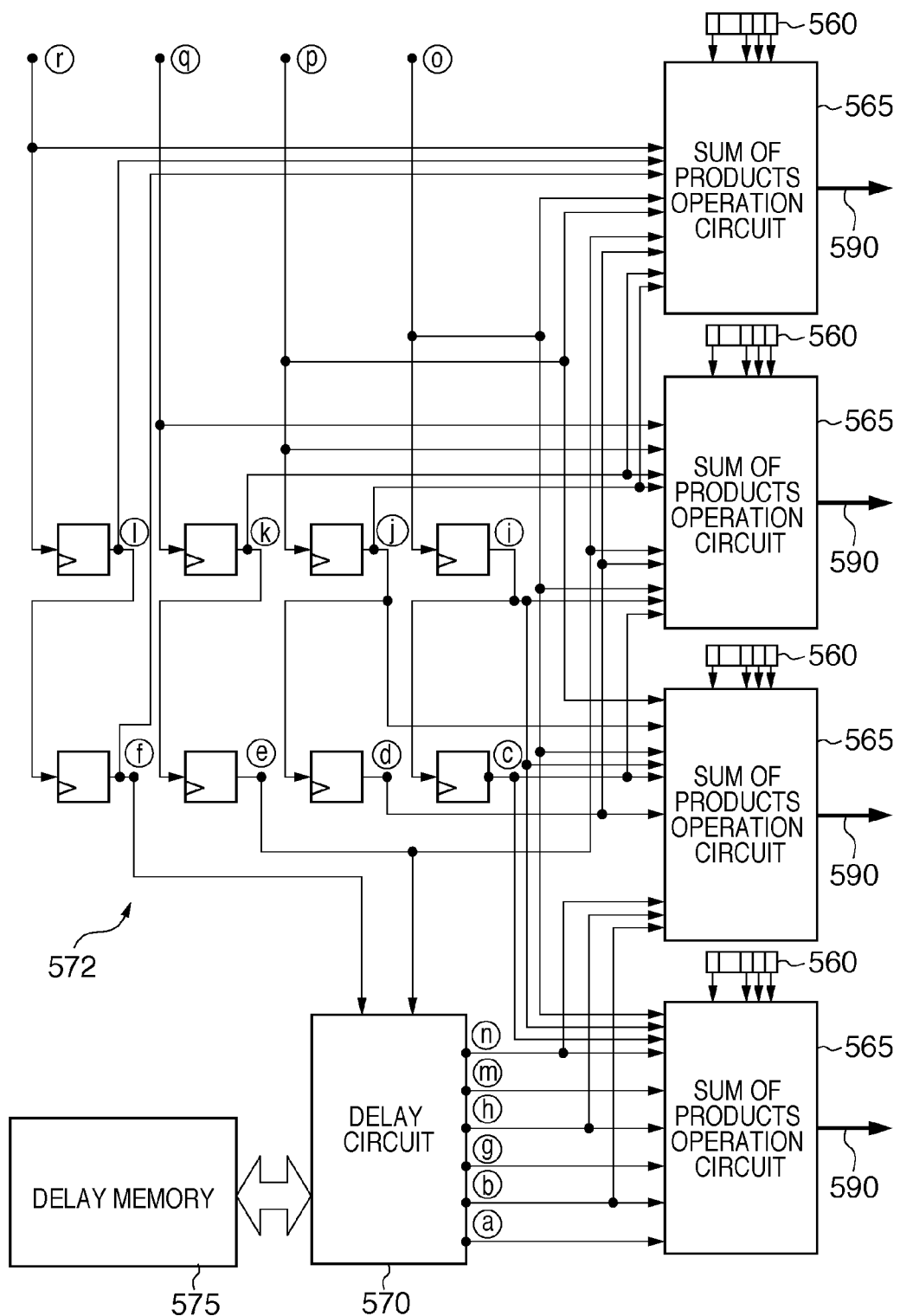
FIG. 8 is a diagram showing the second embodiment of the present invention and depicting an exemplary configuration of an image processing apparatus (spatial filtering circuit).

FIG. 7 shows a pixel region corresponding to FIG. 4E, that is, a region of processing object pixels temporarily held in a spatial filtering circuit 230. As can be seen from FIG. 7, four patterns of spatial filters (nine pixels) 701 to 704 can be extracted at the same time for a set of four input pixels as a unit in the second embodiment. According to the second embodiment, the number N of pixels in a set, which is a unit of processing, is considered as parallelism level pl of parallel distributed processing. N pixels (=pl), nine pixels in this case, are retrieved from registers that hold the pixel regions described above and sum of products operation circuits 565 as many as the number N (=pl) of pixels are connected as shown in FIG. 8, thereby allowing parallel distributed processing in the spatial filtering circuit 230 to be readily performed. In FIG. 8, N=4 and four sum of products operation circuits 565 (1) to 565 (4) are connected.

If one sum of products operation circuit 565 is capable of processing one pixel per clock cycle, N (=pl) pixels can be processed in one clock cycle in the spatial filtering circuit 230 shown in FIG. 8. Therefore, a throughput N (=pl) times faster than that of the spatial filtering circuit 230 of the first embodiment can be achieved.

In the second embodiment, as with the first embodiment, two data accesses are made to a delay memory 575 for a set of N pixels. However, the two data accesses must be accomplished in one clock cycle because the processing speed is increased. That is, the second embodiment requires interleaved access using one dual-port (2-port) memory or two single-port (1-port) memories. However, the increase of processing speed by a factor of N (=pl) by parallel distributed processing of N (=pl) pixels does not need increase of the size of the circuitry of a delay memory as compared with the image processing method in which scanning is performed pixel by pixel as described above.

As has been described, the image processing method according to the second embodiment allows the speed of image processing to be increased by parallel distributed processing even when the resolution of digital image data 300 increases. That is, image data is divided into band areas 301 to 304 in the height direction of band area as shown in FIGS. 3A to 3D, the number N of pixels in a set, which represents a parallelism level pl, is set, and N (=pl) pixels is processed at a time in a parallel distributed manner, thereby allowing the speed of the image processing to be increased.

The first and second embodiments can be combined to perform image processing at a parallelism level pl=2 for N=4 pixels, for example.

As has been described above, according to the embodiments described above, the size of a delay memory required for image processing can be reduced because the size of the delay memory depends on the height of a band area. Furthermore, the number of data accesses per pixel can be reduced because the memory is shared among a set of N pixels specified.

Thus, the size of circuitry can be reduced when local (neighborhood) image processing is serially performed as described above whereas the processing speed can be increased when the image processing is performed in a parallel manner as described above.

While the present invention has been described in detail with respect to embodiments, the present invention can be implemented as a system, apparatus, method, program or storage medium, for example. In particular, the present invention may be applied to a system incorporating multiple devices or may be applied to an apparatus formed by a single device.

The present invention includes an implementation in which a software program is directly or remotely provided to a system or an apparatus and a computer of the system or the apparatus reads and executes the provided program code to accomplish the functions of any of the embodiments described above. The program provided is a computer program corresponding to any of the flowcharts shown in the embodiments.

Therefore, the program code itself installed in a computer in order to implement functions and processing of the present invention by the computer also implements the present invention. That is, the present invention also includes the computer program itself for implementing functions and processing of the present invention.

In that case, the program may be in any form that has functionality of a program, such as an object code, a program executed by an interpreter, or script data to be provided to an operating system.

Examples of computer-readable storage medium for providing the computer program include a floppy disk, hard disk, optical disk, magneto-optical disk, MO, CD-ROM, CD-R, CD-RW, magnetic tape, non-volatile memory card, ROM, and DVD (DVD-ROM and DVD-R).

Alternatively, a browser of a client computer may be used to access a Web page on the Internet to download the computer program of the present invention to a recording medium such as a hard disk. The program downloaded may be a compressed file that includes an automatic installing function. Furthermore, the present invention can also be implemented by dividing a program code constituting the program of the present invention into files and downloading the files from different Web pages. In other words, the present invention also includes a WWW server that allows multiple users to download the program files for implementing functions and processing of the present invention on computers.

The program according to the present invention can be encrypted, stored on a storage medium such as a CD-ROM, and delivered to users. Users who meet predetermined requirements may be allowed to download key information for decrypting the encrypted program from a Web page through the Internet, then the users may use the key information to execute the encrypted program and install the program on a computer.

The functions of any of the embodiments described above can be implemented by a computer reading and executing a program or may be implemented by a computer in cooperation with an OS running on the computer according to instructions of the program. In that case, the OS performs part or all of actual processing and the processing implements functions of any of the embodiments described above.

The program read from a recording medium may be written in a memory provided in a function extension board inserted in a computer or a function extension unit attached to a computer and part or all of functions of any of the embodiments described above may be implemented. In that case, after the program is written in the memory in the function extension board or unit, a CPU provided in the function extension board or unit executes part or all of actual processing in accordance with instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-199896, filed on Jul. 31, 2007, which is hereby incorporated by reference herein in its entirety.

What is claimed is:

1. An image processing method for processing each object pixel using a corresponding window of pixels containing the object pixel, the window having a length and a width, said method comprising:
    a first readout step of transferring a plurality of pixels of a first region in image data from a first memory to a plurality of registers, wherein the first memory stores the image data;
    a second readout step of reading at least one stored pixel of a second region in the image data from a second memory, which has a size that depends on the length and the width of the window;
    a processing step of processing each of the plurality of object pixels using the corresponding window of pixels selected from the plurality of pixels transferred to the plurality of registers and the at least one stored pixel of the second region read from the second memory; and
    a memory step of replacing the at least one stored pixel stored in the second memory with a part of the plurality of pixels deleted from the plurality of registers, to be used for processing a plurality of other pixels.

2. The image processing method according to claim 1, wherein said second readout step includes reading, from the second memory, the second region of the image data including a plurality of pixels to be used for processing of one of the plurality of object pixels.

3. The image processing method according to claim 1, wherein said second readout step includes reading the second region of the image data from the second memory each time a unit of the plurality of pixels is read in said first readout step.

4. The image processing method according to claim 1, wherein the first region has a size corresponding to the number of pixels to be read from the first memory as a unit and to the height of the window.

5. The image processing method according to claim 1, wherein
    said first readout step comprises:
        a first moving step of moving the window in a first direction of the first memory; and
        a second moving step of moving the window in a second direction of the first memory orthogonal to the first direction, when the window moved in said first moving step reaches an end of the first memory; and
    said memory step includes storing in the second memory an amount by which the window is moved in said second moving step and pixel data determined depending on the size of the second region.

6. The image processing method according to claim 1, wherein said processing step includes sequentially processing each of the plurality of object pixels.

7. The image processing method according to claim 1, wherein said processing step includes processing the plurality of object pixels in parallel.

8. An image processing apparatus for processing each object pixel using a corresponding window of pixels containing the object pixel, the window having a length and a width, comprising:
    a first readout unit configured to transfer a plurality of pixels of a first region in image data from a first memory to a plurality of registers, wherein the first memory stores the image data;
    a second readout unit configured to read at least one stored pixel of a second region in the image data from a second memory, which has a size that depends on the length and the width of the window;
    a processing unit configured to process each of the plurality of object pixels using the corresponding window of pixels selected from the plurality of pixels transferred to the plurality of registers and the at least one stored pixel of the second region read from the second memory; and
    a memory unit configured to replace the at least one stored pixel stored in the second memory by a part of the plurality of pixels deleted from the plurality of registers, to be used for processing a plurality of other pixels.

9. The image processing apparatus according to claim 8, wherein said second readout unit reads, from the second memory, the second region of the image data including a plurality of pixels to be used for processing one of the plurality of object pixels.

10. The image processing apparatus according to claim 8, wherein said second readout unit reads the second region of the image data from the second memory each time a unit of the plurality of pixels is read by said first readout unit.

11. The image processing apparatus according to claim 8, wherein the first region has a size corresponding to the number of pixels to be read from the first memory as a unit and to the height of the window.

12. The image processing apparatus according to claim 8, wherein
    said first readout unit
        moves the window in a first direction of the first memory; and
        moves the window in a second direction of the first memory orthogonal to the first direction, when the window moved in the first direction reaches an end of the first memory; and
    said memory unit stores in the second memory an amount by which the window is moved in the second direction and pixel data determined depending on the size of the second region.

13. The image processing apparatus according to claim 8, wherein said processing unit sequentially processes each of the plurality of object pixels.

14. The image processing apparatus according to claim 8, wherein said processing unit processes the plurality of object pixels in parallel.

15. A non-transitory computer-readable storage medium storing, in executable form, a program for causing a computer to execute an image processing method for processing each object pixel using a corresponding window of pixels containing the object pixel, the window having a length and a width, said method comprising:
    a first readout step of transferring a plurality of pixels of a first region in image data from a first memory to a plurality of registers, wherein the first memory stores the image data;
    a second readout step of reading at least one stored pixel of a second region in the image data from a second memory, which has a size that depends on the length and the width of the window;
    a processing step of processing each of the plurality of object pixels using the corresponding window of pixels selected from the plurality of pixels transferred to the plurality of registers and the at least one stored pixel of the second region read from the second memory; and a memory step of replacing the at least one stored pixel stored in the second memory by a part of the plurality of pixels deleted from the plurality of registers, to be used for processing a plurality of other pixels.

16. An image processing apparatus for processing each object pixel using a corresponding window of pixels containing the object pixel, the window having a length and a width, comprising:

a first delay circuit configured to store a plurality of pixels of a first region in image data, wherein said first delay circuit includes a plurality of registers;

a second delay circuit configured to store a plurality of pixels of a second region in the image data, wherein said second delay circuit includes a delay memory having a size that depends on the length and the width of the window; and a processing unit configured to process each of a plurality of object pixels using a window of pixels selected from the plurality of pixels stored by said first delay circuit and said second delay circuit, wherein said first delay circuit replaces a part of the plurality of pixels stored by said second delay circuit by a part of the pixels deleted by said first delay circuit for processing a plurality of other pixels.

17. The image processing apparatus according to claim 8, wherein the plurality of registers include shift registers.

* * * * *